PHONOGRAPH RECORD CHANGER

Filed April 15, 1946

INVENTOR.
Colin B. Dale
BY
Banning & Banning
Att'ys.

Patented Mar. 28, 1950

2,502,208

UNITED STATES PATENT OFFICE 2,502,208

PHONOGRAPH RECORD CHANGER

Colin B. Dale, Oak Park, Ill., assignor to Webster-Chicago Corporation, Chicago, Ill., a corporation of Illinois Application April 15, 1946, Serial No. 662,294

8 Claims. (Cl. 274—10)

Prior to the present invention, automatic phonograph record changers of the drop type have been designed for one particular thickness of record and have not worked well on records of a substantially different thickness. However, there are now records of only about half the thickness of the records which have been conventional heretofore. According to the present invention, a record changer is provided which will play either thickness of record reliably, and, generally speaking, will permit intermixing of the two thicknesses in a stack so that the bottom record will be dropped off at the proper time whether it be a thin record, or a conventional thick record.

This is accomplished mainly by providing a special stop member which acts to oppose the movement of the records resting on the shelf of the spindle, except the bottom record, so that only the bottom record to which the push-off force is directly applied will be pushed off.

For most records, the push-off member can be the same whether the records are thin or thick, but for records with bevelled edges, the thin push-off member will not work reliably and hence it is also desirable to have an adjustable push-off member. Such a member is provided by the present invention.

The stop or block member of the present invention is also advantageous aside from its being adaptable for two different thicknesses of records. Even if only one thickness should be used, this block reliably confines the push-off action to the bottom record. Blocks for this purpose have been proposed heretofore, but the present block is desirable not only because of its reliability in this regard, but also because it is so constructed that the records may be lifted off of the spindle after they have been played. Some block members or latches known before the present invention have required that the spindle be removed before the records could be removed. At least one has permitted removal of the records, but compared to it, the present form is less likely to cause damage to the hole in the record, and is also more reliable.

Additional objects and advantages of the invention will be apparent from the following description and from the drawings, in which Fig. 1 represents the preferred embodiment of the invention in use with thin records;

Figures 1, 2, 3, 4, 5, 5A, 6:
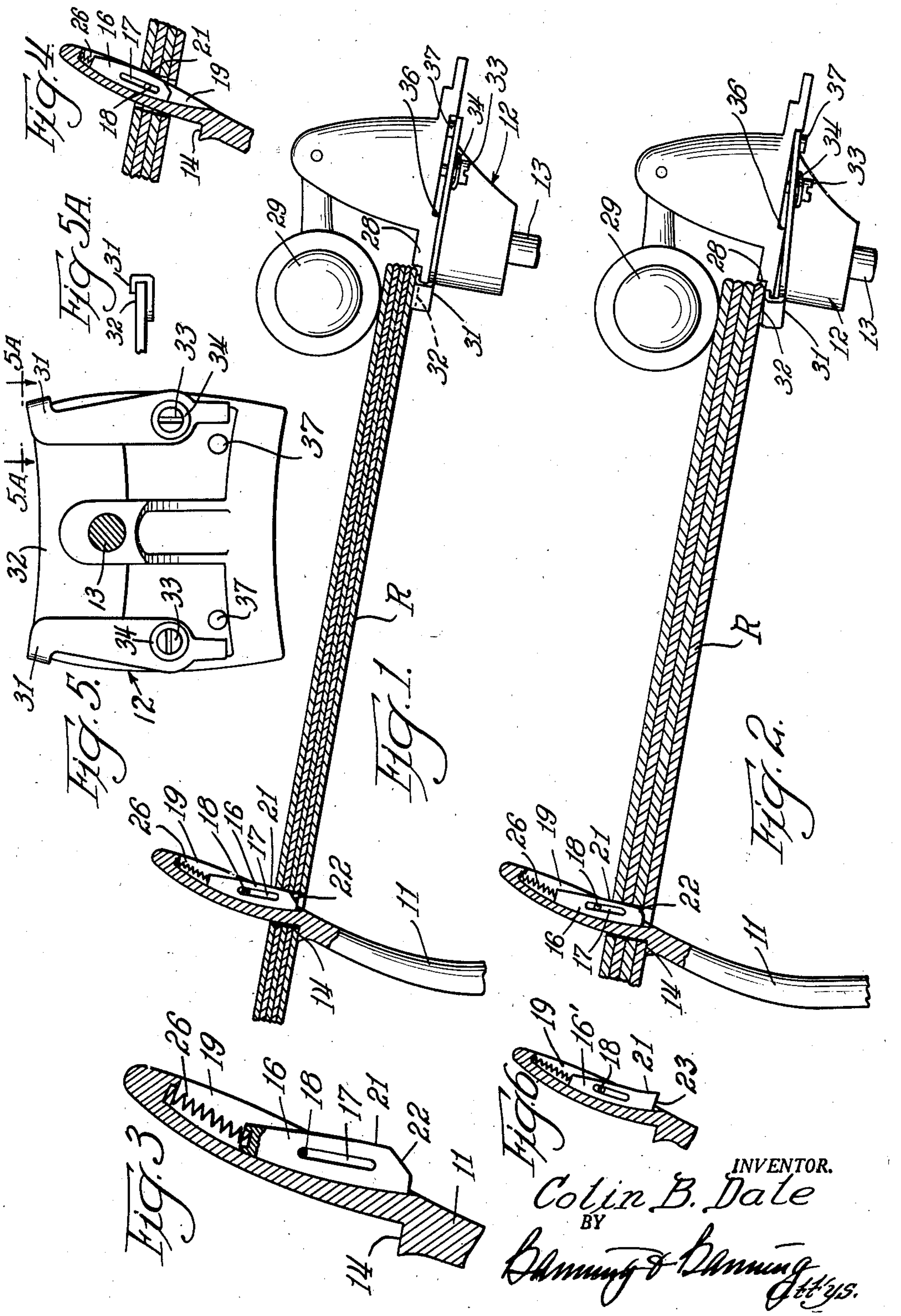
Fig. 2 represents the same embodiment of the invention in use with thick records.
Fig. 3 is an enlarged view showing the details of construction of the form of the invention shown in Figs. 1 and 2.
Fig. 4 is a fragmentary view illustrating the removal of the records from the spindle.
Fig. 5 is a bottom view of the push-off structure shown in Figs. 1 and 2.
Fig. 5A is a fragmentary view, looking from the position and in the direction indicated by line 5A—5A in Fig. 5, illustrating the end of the push-off head.
Fig. 6 is a view of a modified form of the invention which is suitable for use when the variation of record thickness is not so wide as that for which the preferred form of the invention is suitable.

The illustrated form of the invention includes a spindle 11 and a push-off head 12. The spindle 11 is stationary and the push-off head 12 is carried by a shank 13 which may be moved toward and from the spindle 11 to push the bottom record R off of a shelf 14 formed on the spindle 11. This is a well-known method of feeding records from a stack to a turntable and, therefore, the manner of controlling the push-off shank 13 and head 12 need not be described.

A preferred structure for operating the push-off head is disclosed in my copending application, Ser. No. 595,844, filed May 25, 1945, of which the present application is a continuation in part.

If no means were provided for opposing the movement of the upper records, the frictional engagement between the records would cause them to move all together in response to the pushing of the lower record by the push-off head 12. Of course it is essential to feed the records one at a time and hence some means must be provided for opposing the movement of the upper records.

According to the present invention, the selective block member 16 is provided. In the past, members serving a partially similar function have been called latches, but the term "block" is preferred in the present instance because the member is not really a latch in its function or construction. This block is provided with a slot 17 through which a pin 18 extends, the pin being fixed in the upper portion of the spindle 11 which is provided with a vertical slot 19 to receive the block 16. When the block 16 is in its lowermost position, resting on the pin 18, the dimensions are such that a record will easily slip over it to rest upon the shelf 14.

The records which bear on the side or generally vertical face 21 of the block 16 cannot possibly move the block. Hence in the case of Fig.

6 where all of the records expect the bottom records rest against the vertical or side face 21, it is impossible for the push-off member to push any record except the bottom record from the shelf 14. However, when the records have been played and are lifted upwardly along the spindle, they will strike the bottom face 22 (or 23 in Fig. 6) and slide the block upwardly on the pin 18 to the position shown in Fig. 4 in which position the records can be raised off of the spindle, freely passing the block 16.

If records were used in the Fig. 6 form so thin that two records could pass under the end face 23, there would be danger that two records would be fed to the turntable. If the block 16' were reproportioned so that its bottom surface were lower, it would be impossible to play a record of the thickness shown in Fig. 2. Nevertheless such a wide variety of thicknesses may be dependably fed by the aid of the block 16 shown in Figs. 1–4. In this instance, the bottom or end face 22 is provided with a beveled portion as shown which, with the block 16 in its lowest position, extends from slightly above the top of the thickest bottom record to slightly below the top of the thinnest bottom record for which the apparatus is designed. Hence in all cases, the next to the bottom record will strike the bevel of the bottom face 22. The angle of this beveled surface and the strength of a spring 26 which opposes the upward movement of block 16 is such that movement of the records above the bottom record is adequately opposed. It does not take an extremely great force to oppose the movement of the next to the bottom record because the records above it, which are positively blocked, help oppose the movement of the next to the bottom record. In other words, the frictional force which must be overcome by the beveled portion of the bottom face 22 is the difference between the frictional forces applied to the two faces of the next to the bottom record. The difference in these forces results almost entirely from the weight of the next to the bottom record itself. Hence, it is only the increment of friction due to the weight of this one record which the surface 22 need overcome.

Even without the spring 26, the block 16 of the shape shown would usually suffice to sufficiently oppose the movement of the records above the bottom record, but the action is entirely dependable with the spring 26, and its use is at present preferred.

*Push-Off Adjustment*

It is, of course, important that the push-off head 12 engage only the bottom record. If it pushed the next to the bottom record, that record would also be fed, or in the case of the Fig. 6 structure, would be broken. With the push-off shoulder 28 of the effective height shown in Fig. 1, only the bottom thin record will be engaged. With most thick records, this height of shoulder is sufficient. With some thick records, however, particularly those of one manufacturer, the record edge is so beveled that a shoulder of the effective height shown in Fig. 1 would cam under the thick record in spite of the downward pressure exerted thereon by the hold-down device 29. Accordingly, for these records a higher effective height for the shoulder 28 is desired. To this end, a pair of clips 31 are provided which can be clipped over the seat 32 of the push-off head so as to reduce the effective height of the shoulder 28. Thus, in Fig. 1, the clips are in their active position on the seat 32, and the effective height of the shoulder 28 is appropriate for thin records. In Fig. 2, the clips have been removed from the seat 32 and the effective height of shoulder 28 is appropriate for the thick records. The nature of these clips 31 is shown in Figs. 5 and 5A. Each of them is pivoted to the undersurface of the head by a screw 33 which bears on a spring washer 34 slightly to the rear of a fulcrum 36 formed on the body of the head. Thus the spring washer 34 urges the clip 31 downwardly to the position shown in Fig. 2. The clip, or the active end thereof may, however, be raised and pivoted in so that it hooks over the seat 32 as shown in Figs. 1, 5, and 5A.

A stop pin 37 is integrally formed on the bottom of the head 12 to limit the outward movement of the clips 31. The head 12 is preferably molded of a plastic.

From the foregoing, it is seen that a record changer is provided which is exceedingly simple and which is nevertheless appropriate for the feeding of records of widely differing thicknesses. Even with only one thickness, it has the advantage of complete reliability in feeding only one record while at the same time permitting the played records to be lifted off the spindle without removal of the spindle.

I claim:

1. Record changing apparatus including a turntable, a spindle having a record-supporting shelf at one side thereof, a push-off member for pushing records one at a time from said shelf to drop to the turntable, and a block above the shelf adapted to restrain upper records when the bottom record is pushed from the shelf, said block being slidably carried by the spindle at the side thereof opposite the shelf and moving inwardly in response to upward movement to permit records to be moved freely upwardly past the block and having its lower end beveled to accommodate thereunder two thicknesses of records, the bevel extending from a high point furthest away from the shelf, and thereabove for a distance corresponding to the thickness of a thick record, downwardly to a point closer to the shelf than twice the thickness of a thin record.

2. Record changing apparatus including a turntable, a spindle having a record-supporting shelf thereon at one side thereof, a push-off member for pushing records one at a time from said shelf to drop to the turntable, a block above the shelf at the spindle side opposite thereto adapted to restrain upper records when the bottom record is pushed from the shelf having its lower end beveled to accommodate two thicknesses of records, the bevel extending from a point furthest away from the shelf, and thereabove for a distance corresponding to the thickness of a thick record, downwardly to a point closer to the shelf than twice the thickness of a thin record.

3. A record changing apparatus including a spindle having at one side thereof a record-supporting shelf thereon, a block carried by the spindle at the side thereof opposite the shelf for sliding in a direction generally axially of the spindle, guide means associated with the block for moving it to a retracted position upon upward movement thereof to permit records to be withdrawn freely from the spindle, the outer face of the block extending generally axially of the spindle whereby records pressing thereagainst will have substantially no tendency to move the block, and said outer face terminating a distance above the shelf sufficient for one record to pass thereunder as it is pushed off of the shelf, and the lower face of the block extending downwardly and angularly toward the shelf for point engagement with the upper of two records when the lower of these records is rested on the shelf, and a spring coacting with the block for urging it downwardly toward the shelf.

4. A record changing apparatus including a spindle having at one side thereof a record-supporting shelf thereon, a block slidingly carried by the spindle at the side thereof opposite the shelf, guide means associated with the block for moving it to a retracted position upon upward movement thereof to permit records to be withdrawn freely from the spindle, and a spring urging the block downwardly, the outer face of the block extending generally axially of the spindle whereby records pressing thereagainst will have substantially no tendency to move the block, and said outer face joining with the bottom face of the block through a bevel which is disposed above the shelf a distance sufficient for one record to pass thereunder as it is pushed off of the shelf.

5. A turntable spindle for automatic phonographs which comprises a shank portion adapted to be mounted in concentric relation with the turntable, said shank portion having a record supporting shoulder thereon, a head portion beyond said shoulder for reception of a stack of unplayed records the lowermost one of which may rest on said shoulder, said head portion having a seat therein terminating in an opening at the side of said head opposite said shoulder, a record detaining member slidably carried in said seat, and yieldable means associated with said member normally holding said member projected through said opening in a position such that said member is spaced from said shoulder a distance somewhat greater than the thickness of a record whereby said lowermost record may be moved laterally off of said shoulder to enable it to slide down along said shank portion toward said turntable while said detaining member prevents lateral movement of the remaining records of the stack, said detaining member being movable into said seat in opposition to said yieldable means when engaged by a record raised along said shank into engagement therewith to thereby permit movement of said last named record along the entire length of said spindle.

6. A turntable spindle for automatic phonographs which comprises a shank portion adapted to be mounted in concentric relation with the turntable, said shank portion having a record supporting shoulder thereon, a head portion extending upwardly from said shank portion above said shoulder and in offset relation to said shank portion for the reception of a stack of unplayed records the lowermost one of which may rest on said shoulder, said head portion having a longitudinal recess therein terminating in an opening at the side of said head opposite said shoulder, a record detaining member slidably carried in said recess, and yieldable means within said recess associated with said member for normally causing the lower end of said member to extend through said opening a distance such that its said lower end is spaced from said shoulder a distance somewhat greater than the thickness of a record whereby said lowermost record may be moved laterally off of said shoulder to enable it to slide down along said shank portion toward said turntable while said detaining member prevents lateral movement of the remaining records of the stack, said detaining member being movable into said recess in opposition to said yieldable means when engaged by a record raised along said shank into engagement therewith to thereby permit continued movement of said last named record along said head for removal thereof from said spindle.

7. A turntable spindle according to claim 6 characterized in that said lower end of said detaining member is angularly related to the adjacent side of said head portion whereby continued upward movement of said last named record after engagement with said angularly related end will cam said detaining member into said recess to clear the path for itself along said head portion.

8. A turntable spindle according to claim 6 characterized in that said head portion is angularly related to said shoulder, characterized further in that said recess extends substantially longitudinally along said head portion, and characterized still further in that said lower end of said detaining member is angularly related to the adjacent side of said head portion whereby continued upward movement of said last named record after engagement with said angularly related end will cam said detaining member into said recess to clear the path for itself along said head portion.

COLIN B. DALE.

REFERENCES CITED

The following references are of record in the file of this patent:

UNITED STATES PATENTS

| Number | Name | Date |
|---|---|---|
| 2,331,383 | Faulkner | Oct. 12, 1943 |
| 2,352,542 | Heins, Jr. | June 27, 1944 |
| 2,374,080 | Dale | Apr. 17, 1945 |